(12) United States Patent
Lutz et al.

(10) Patent No.: US 7,357,273 B1
(45) Date of Patent: Apr. 15, 2008

(54) CONTAINER UNIT

(76) Inventors: Trent L. Lutz, 967 Rhonda Pl. SE., Leesburg, VA (US) 20175; Mary E. Young-Lutz, 967 Rhonda Pl. SE., Leesburg, VA (US) 20175

( * ) Notice: Subject to any disclaimer, the term of this patent is extended or adjusted under 35 U.S.C. 154(b) by 592 days.

(21) Appl. No.: 10/905,742

(22) Filed: Jan. 19, 2005

(51) Int. Cl.
*B65D 51/16* (2006.01)
*B65D 41/16* (2006.01)
*B65D 25/24* (2006.01)

(52) U.S. Cl. .................. 220/785; 220/366.1; 220/379; 220/790; 220/791; 220/633; 220/636

(58) Field of Classification Search ............ 220/366.1, 220/784–787, 379, 635, 633, 631, 628, 793, 220/4.21, 636, 345.1, 345.4, 638, 606, 790, 220/791; 206/599, 386, 45.2, 765; 40/313
See application file for complete search history.

(56) References Cited

U.S. PATENT DOCUMENTS

| 2,164,832 | A | * | 7/1939 | Nitardy | .................. 206/534.1 |
|---|---|---|---|---|---|
| D196,457 | S | | 10/1963 | Wagner | |
| 3,391,850 | A | | 7/1968 | Torgerson et al. | |
| D257,133 | S | | 9/1980 | McKinnon | |
| 4,331,258 | A | | 5/1982 | Geschwind | |
| D294,680 | S | | 3/1988 | Pappert | |
| D317,411 | S | | 6/1991 | Holmes | |
| 5,184,745 | A | | 2/1993 | Havens et al. | |
| 5,392,949 | A | | 2/1995 | McKenna | |
| 5,586,656 | A | * | 12/1996 | Abrums | ...................... 206/501 |
| 5,762,226 | A | * | 6/1998 | Baltus et al. | ............ 220/212.5 |
| 7,097,067 | B2 | * | 8/2006 | Scarabelli et al. | .......... 220/796 |
| 2006/0138134 | A1 | * | 6/2006 | Martin | ....................... 220/253 |

* cited by examiner

*Primary Examiner*—Robin Hylton
(74) *Attorney, Agent, or Firm*—Donald R. Schoonover

(57) ABSTRACT

A container unit includes a container body having a ledge unit on the bottom thereof. A lid is slidably stored on the ledge unit and is thus stored with the container body and is readily available for use when needed. The container body also has air vent slits defined therein near the top rim thereof and the lid covers these vents when in place.

1 Claim, 2 Drawing Sheets

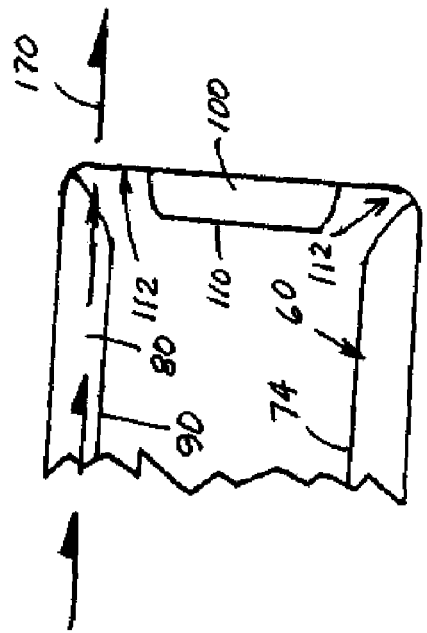
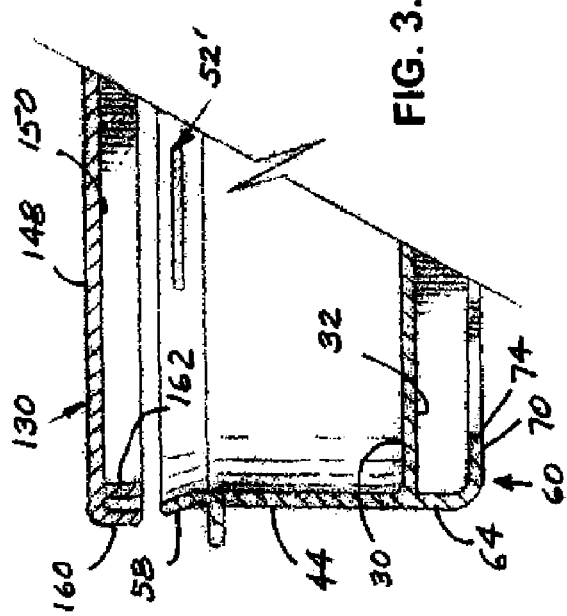
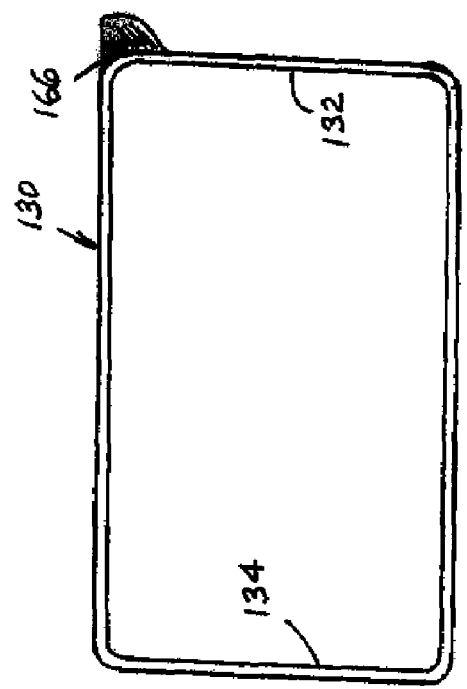
FIG. 3.
FIG. 4.
FIG. 5.

CONTAINER UNIT

BACKGROUND OF THE INVENTION

The present invention relates to the general art of containers, and to the particular field of container and lid combinations.

It is quite common for people to store food in plastic containers. This food is stored in the refrigerator or in the freezer or in a cabinet, as suitable. These containers may simply store the food or, as is often the case, provide a convenient vessel in which the food can be cooked or heated. This type of container has been very convenient.

However, one drawback to such containers it that the lids therefor may, and often do, become separated from the container. Thus, when one wishes to use a container, a search must be conducted for the lid. If one owns several containers, there may be many lids, all of different sizes, through which the search must be conducted. This can be time consuming and annoying. Lids often become lost, and this exacerbates the annoyance.

Therefore, there is a need for a means for storing a lid for a container in an efficient manner.

Sometimes, lids are stored in a location that differs from the storage location of the container. Therefore, even if the lid can be found, a user must move between two locations to form a single container. Again, this can be time consuming and annoying.

Therefore, there is a need for a means for storing a lid for a container in a location that is convenient to the container.

It is often difficult to properly seal a container. Air becomes trapped in the container and it must be "burped" in order to remove excess air so the container can be properly sealed. This may be difficult if a person's dexterity is limited.

Therefore, there is a need for a container from which air can be easily removed.

PRINCIPAL OBJECTS OF THE INVENTION

It is a main object of the present invention to provide a means for storing a lid for a container in an efficient manner.

It is another object of the present invention to provide a means for storing a lid for a container in a location that is convenient to the container.

It is another object of the present invention to provide a container from which air can be easily removed.

SUMMARY OF THE INVENTION

These, and other, objects are achieved by a container having a ledge unit on the bottom into which a lid can be slidably stored. The lid remains with the container during storage and is easily removed by sliding it out of the ledge unit for use.

Using the combination embodying the present invention will permit a lid for a container to be efficiently stored in a convenient location, to wit: directly on the container.

BRIEF DESCRIPTION OF THE DRAWING FIGURES

FIG. 3 is an elevational view of a portion of the container and lid combination shown in FIG. 1 showing the vent slots defined in the container adjacent to the lip of the container and which will be covered and closed by the lid when the lid is in place on the container.

FIG. 4 is a plan view of the lid.

FIG. 5 is a schematic representation showing movement of the lid in the lid storage area on the container.

DETAILED DESCRIPTION OF THE PREFERRED EMBODIMENT

Figures 1, 2:
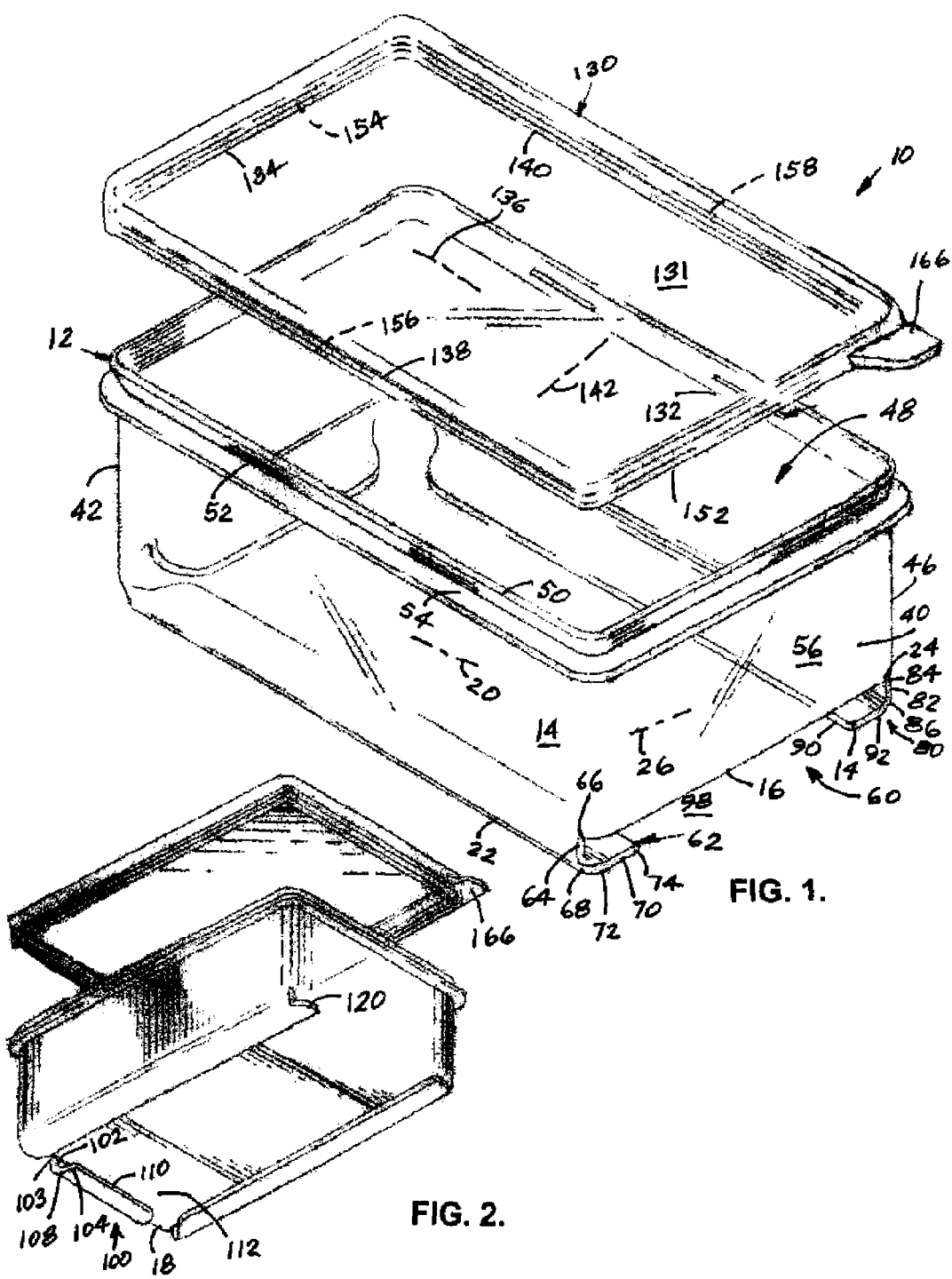
FIG. 1 is a perspective view of a container and lid combination embodying the present invention.
FIG. 2 is a bottom perspective view of a container and lid combination embodying the present invention.

Other objects, features and advantages of the invention will become apparent from a consideration of the following detailed description and the accompanying drawings.

Referring to the Figures, it can be understood that the present invention is embodied in a container unit 10 that achieves the above-stated objectives.

Container unit 10 comprises a body 12 which includes a planar element 14 which is a bottom when body 12 is in use. Planar element 14 includes a first end 16, a second end 18, and a longitudinal axis 20 which extends between first end 16 and second end 18. Planar element 14 also includes a first side 22, a second side 24, and a transverse axis 26 which extends between first side 22 and second side 24. As is best seen in FIG. 3, a first surface 30 is a top surface when body 12 is in use and a second surface 32 is a bottom surface when body 12 is in use.

Referring back to FIG. 1, it can be seen that body 12 further includes a first end wall 40 on first end 16 of body 12, a second end wall 42 on second end 18 of planar element 14, a first side wall 44 on first side 22 of planar element 14, and a second side wall 46 on second side 24 of planar element 14.

The walls extend in a plane that is perpendicular to a plane containing planar element 14 and define with the planar element 14 a storage volume 48 in which food or the like can be stored in the manner known to those skilled in the art.

Each wall has a rim, such as rim 50 on first side wall 44, that is spaced apart from planar element 14 and which is a top rim when body 12 is in use. The top rims of the walls are all co-planar with each other.

Each side wall has an air vent, such as air vent 52 in first side wall 44, defined therein adjacent to the top rim 50 thereof. It is noted that, if desired, the end walls can also have air vents, such as air vent 52', defined therein as well.

Each wall has a shoulder element, such as shoulder element 54 on first side wall 44, thereon. The shoulder elements on the side walls are located adjacent to the air vent 52 defined therein.

Each wall has a base portion, such as base portion 56 of first end wall 40, located between the shoulder element 54 thereon and planar element 14.

Each wall further includes a locking portion, such as locking portion 58 on first side wall 44 as shown in FIG. 3, located between the shoulder element 54 thereon and the rim 50 thereof. Each locking portion 58 is planar and oriented at an oblique angle to the base portion 56 thereof. The locking portion 58 of each wall extends outwardly with respect to storage volume 48 and the air vents 52 are located in the locking portion 58 of each side wall.

A lid storage section 60 is located on body 12 and includes a first L-shaped bracket 62 which has a first leg 64, which includes a proximal end 66 that is fixedly secured to second surface 32 of planar element 14 adjacent to first side 22 of the planar element 14 and a distal end 68 that is spaced apart from second surface 32 of planar element 14. Bracket 62 further includes a second leg 70, which includes a proximal end 72 that is unitary with distal end 68 of first leg 64 and which extends from first leg 64 toward second side 24 of planar element 14. Second leg 70 is oriented in a plane that is parallel with planar element 14 and has a distal end 74 that is spaced apart from proximal end 72 and which is located between first side 22 of the planar element 14 and second side 24 of the planar element 14.

First L-shaped bracket 62 extends from first end 16 of planar element 14 to second end 18 of the planar element 14 in the direction of the longitudinal axis 20 of the planar element 14.

Lid storage section 60 further includes a second L-shaped bracket 80 which is similar to the first L-shaped bracket 62 and has a first leg 82 which includes a proximal end 84 fixedly secured to second surface 32 of planar element 14 adjacent to second side 24 of the planar element 14 and a distal end 86 that is spaced apart from second surface 32 of the planar element 14.

Second L-shaped bracket 80 further includes a second leg 90 which includes a proximal end 92 that is unitary with distal end 86 of first leg 82 of the second L-shaped bracket 80 and which extends from first leg 82 toward first side 22 of planar element 14. Second leg 90 is oriented in a plane that is parallel with planar element 14 and has a distal end 94 that is spaced apart from proximal end 92 of second leg 90 and is located between second side 24 of planar element 14 and first side 22 of the planar element 14.

Second leg 90 is co-planar with second leg 70 of first L-shaped bracket 62 and distal end 94 of second leg 90 is spaced apart from distal end 74 of second leg 70 of first L-shaped bracket 62 and defines a gap 98 therebetween.

Second L-shaped bracket 80 extends from first end 16 of planar element 14 to second end 18 of the planar element 14 in the direction of longitudinal axis 20.

As best seen in FIG. 2, lid storage section 60 further includes a third L-shaped bracket 100 which has a first leg 102 which includes a proximal end 103, that is fixedly secured to second surface 32 of planar element 14 adjacent to second end 18 of the planar element 14, and a distal end 104, that is spaced apart from second surface 32 of the planar element 14.

A second leg 106 of bracket 100 includes a proximal end 108 that is unitary with distal end 104 of first leg 102 of third L-shaped bracket 100 and extends from first leg 102 toward first end 16 of planar element 14. Second leg 106 is oriented in a plane that is parallel with planar element 14 and has a distal end 110 that is spaced apart from proximal end 108 and is located between second end 18 of planar element 14 and first end 16 of the planar element 14.

Second leg 106 is co-planar with the second legs 70, 90 of the first and second L-shaped brackets 62, 80 and distal end 110 is spaced apart from the distal ends 74, 94 of the second legs 70, 90 of the first and second L-shaped brackets 62, 80 and defines a gap 112 with the distal ends 74, 94 of the second legs 70, 90 of the first and second L-shaped brackets 62, 80.

The second legs 70, 90, 106 of the first, second and third L-shaped brackets 62, 80, 100 define a lid-supporting ledge 120 adjacent to second surface 32 of planar element 14 of body 12.

A lid 130 includes a planar portion 131 which includes a first end 132, a second end 134, and a longitudinal axis 136 which extends between first end 132 and second end 134, a first side 138, a second side 140, and a transverse axis 142 which extends between first side 138 and second side 140. Lid 130 further includes a first surface 148, which is a top surface when lid 130 is in use, and a second surface 150, which is a bottom surface when lid 130 is in use. A first end groove 152 is defined in planar portion 131 adjacent to first end 132 of planar portion 131, a second end groove 154 is defined in planar portion 131 adjacent to second end 134 of the planar portion 131, a first side groove 156 is defined in planar portion 131 adjacent to first side 138 of planar portion 131, and a second side groove 158 is defined in planar portion 131 adjacent to second side 140 of planar portion 131. The grooves of lid 130 are sized and adapted to frictionally accommodate the locking portions 58 of the walls of body 12 when lid 130 is in place on body 12. The lid 130 further includes portions, such as portion 160 and 162, which are located to cover the air vents 52 defined in the side walls of body 12 when the lid 130 is in place on the body 12.

Lid 130 also has a projection 166 on the first end 132 of the lid 130. Projection 166 is grasped by a user when the lid 130 is to be moved or manipulated.

The lid 130 is sized and adapted to be slidably accommodated in the lid-supporting ledge 120 of the lid storage section 60 between the lid-supporting ledge 120 and the second surface 32 of the planar element 14 of body 12 with projection 166 extending beyond first end 16 of planar element 14 during storage of the lid 130.

Use and operation of container unit 10 can be understood by those skilled in the art based on the teaching of the foregoing disclosure and therefore such use and operation will only be briefly described. When unit 10 is stored, the lid 130 is stored in lid storage section 60 by being supported on the ledge 120 of the lid storage section 60 beneath planar element 14 after being slidingly placed on the ledge 120 in direction 170. When the container is to be closed, the lid 130 is removed from the lid storage section 60 by grasping projection 166 and sliding the lid 130 out of the lid storage section 60 and placing the lid 130 on body 12. While the lid 130 is being moved onto the body 12, air will be forced out of storage volume 48 through the air vents 52. After the lid 130 is seated on the body 12, the lid 130 will cover the air vents 52 thereby sealing storage volume 48.

Additionally, the lid 130 may rest without being moved onto the body 12 to allow hot air to be forced out of storage volume 48 through the air vents 52 when container unit 10 is used to cook or heat food.

It is to be understood that while certain forms of the present invention have been illustrated and described herein, it is not to be limited to the specific forms or arrangements of parts described and shown.

What is claimed is:

1. A container unit comprising:
   (a) a body which includes
      (1) a planar element which is a bottom when said body is in use, the planar element including a first end, a second end, a longitudinal axis which extends between the first end and the second end, a first side, a second side, a transverse axis which extends between the first side and the second side, a first surface which is a top surface when said body is in use, and a second surface which is a bottom surface when said body is in use,
      (2) a first end wall on the first end of the planar element of said body,
      (3) a second end wall which is on the second end of the planar element of said body,
      (4) a first side wall which is on the first side of the planar element of said body, (5) a second side wall which is on the second side of the planar element of said body, (6) the walls extending in a plane that is perpendicular to a plane containing the planar element and defining with the planar element a storage volume, (7) each wall having a rim that is spaced apart from the planar element and which is a top rim when said body is in use, the top rims of the walls all being co-planar with each other, (8) each side wall having an air vent defined therein adjacent to the top rim thereof, (9) each side wall having a shoulder element thereon adjacent to the air vent defined therein,

(10) each wall having a base portion located between the shoulder element thereon and the planar element, and

(11) each wall having a locking portion located between the shoulder element thereon and the rim thereof, each locking portion being planar and oriented at an oblique angle to the base portion thereof, the locking portion of each wall extending outwardly with respect to the storage volume, the air vents being located in the locking portion of each side wall;

(b) a lid storage section on said body and which includes (1) a first L-shaped bracket having (A) a first leg which includes a proximal end that is fixedly secured to the second surface of the planar element of said body adjacent to the first side of the planar element, and a distal end that is spaced apart from the second surface of the planar element of said body, (B) a second leg which includes a proximal end that is unitary with the distal end of the first leg and which extends from the first leg toward the second side of the planar element of said body, the second leg of the first L-shaped bracket being oriented in a plane that is parallel with the planar element of said body and having a distal end that is spaced apart from the proximal end of the second leg of the first L-shaped bracket and which is located between the first side of the planar element and the second side of the planar element, and (C) the first L-shaped bracket extending from the first end of the planar element to the second end of the planar element in the direction of the longitudinal axis of the planar element, (2) a second L-shaped bracket having (A) a first leg which includes a proximal end that is fixedly secured to the second surface of the planar element of said body adjacent to the second side of the planar element, and a distal end that is spaced apart from the second surface of the planar element of said body, (B) a second leg which includes a proximal end that is unitary with the distal end of the first leg of the second L-shaped bracket and which extends from the first leg of the second L-shaped bracket toward the first side of the planar element of said body, the second leg of the second L-shaped bracket being oriented in a plane that is parallel with the planar element of said body and having a distal end that is spaced apart from the proximal end of the second leg of the second L-shaped bracket and which is located between the second side of the planar element and the first side of the planar element, (C) the second leg of the second L-shaped bracket being co-planar with the second leg of the first L-shaped bracket, (D) the distal end of the second leg of the second L-shaped bracket being spaced apart from the distal end of the second leg of the first L-shaped bracket and defining a gap therebetween, (E) the second L-shaped bracket extending from the first end of the planar element to the second end of the planar element in the direction of the longitudinal axis of the planar element, and (3) a third L-shaped bracket having (A) a first leg which includes a proximal end that is fixedly secured to the second surface of the planar element of said body adjacent to the second end of the planar element, and a distal end that is spaced apart from the second surface of the planar element of said body, (B) a second leg which includes a proximal end that is unitary with the distal end of the first leg of the third L-shaped bracket and which extends from the first leg of the third L-shaped bracket toward the first end of the planar element of said body, the second leg of the third L-shaped bracket being oriented in a plane that is parallel with the planar element of said body and having a distal end that is spaced apart from the proximal end of the second leg of the third L-shaped bracket and which is located between the second end of the planar element and the first end of the planar element, (C) the second leg of the third L-shaped bracket being co-planar with the second legs of the first and second L-shaped brackets, and (D) the distal end of the second leg of the third L-shaped bracket being spaced apart from the distal ends of the second legs of the first and second L-shaped brackets and defining a gap with the distal ends of the second legs of the first and second L-shaped brackets, and (4) the second legs of the first, second and third L-shaped brackets defining a lid supporting ledge adjacent to the second surface of the planar element of said body;

(c) a lid which includes (1) a planar portion which includes a first end, a second end, a longitudinal axis which extends between the first end of the planar portion of said lid and the second end of the planar portion of said lid, a first side, a second side, a transverse axis which extends between the first side of the planar portion of said lid and the second side of the planar portion of said lid, a first surface which is a top surface when said lid is in use, a second surface which is a bottom surface when said lid is in use, a first end groove defined in the planar portion of said lid adjacent to the first end of the planar portion of said lid, a second end groove defined in the planar portion of said lid adjacent to the second end of the planar portion of said lid, a first side groove defined in the planar portion of said lid adjacent to the first side of the planar portion of said lid, a second side groove defined in the planar portion of said lid adjacent to the second side of the planar portion of said lid, the grooves of said lid being sized and adapted to frictionally accommodate the locking portions of the walls of said body when said lid is in place on said body, said lid further including portions which are located to cover the air vents defined in the side walls of said body when said lid is in place on said body, and (2) a projection on the first end of said lid; and (d) said lid being sized and adapted to be slidably accommodated in the lid supporting ledge of said lid storage section between the lid supporting ledge and the second surface of the planar element of said body with the projection extending beyond the first end of the planar portion of said body during storage of said lid.

* * * * *